United States Patent [19]

Uchida et al.

[11] Patent Number: 5,037,213
[45] Date of Patent: Aug. 6, 1991

[54] SEALED ROLLING BEARING

[75] Inventors: Hiroyuki Uchida, Yokohama; Koichi Goto, Fujisawa, both of Japan

[73] Assignee: Nippon Seiko Kabushiki Kaisha, Tokyo, Japan

[21] Appl. No.: 525,204

[22] Filed: May 4, 1990

Related U.S. Application Data

[63] Continuation of Ser. No. 363,044, Jun. 7, 1989, abandoned.

[30] Foreign Application Priority Data

Jun. 16, 1988 [JP] Japan .................................. 63-78896

[51] Int. Cl.⁵ .............................................. F16C 33/78
[52] U.S. Cl. .................................... 384/482; 384/484; 384/488
[58] Field of Search ............... 384/480, 482, 484, 144, 384/140; 277/95

[56] References Cited

U.S. PATENT DOCUMENTS 4,505,484 3/1985 Ohkuma et al. .................... 384/482

FOREIGN PATENT DOCUMENTS 62-85723 6/1987 Japan .

Primary Examiner—Lenard A. Footland
Attorney, Agent, or Firm—Shapiro and Shapiro

[57] ABSTRACT

A sealed rolling bearing including inner and outer races and a pair of sealing plates in which fixing grooves each for fixedly receiving a fixing edge portion of a corresponding sealing plate are formed in the edge portions of the peripheral surface of one of the inner and outer races, and slide grooves each for slidably receiving a slidable seal edge portion of a corresponding one of the sealing plates are formed in the edge portions of the peripheral surface of the other race. Each slide groove has a U-shaped cross-section including a bottom surface and a pair of axially outward and inward inclined surfaces. Each sealing plate comprises a core and a flexible seal member integrally fixed to the core, and first, second and third lips which extend axially outwardly, axially inwardly and substantially radially, respectively are formed on the slidable seal edge portion of each sealing plate. The first lip is slidably abutted against a peripheral surface contiguous to the axially outward inclinded surface of the corresponding slide groove, the second lip is slidably abutted against the axially inward inclined surface, and the third lip confronts the bottom surface with a slight clearance.

10 Claims, 1 Drawing Sheet

SEALED ROLLING BEARING

This is a continuation of application Ser. No. 363,044 filed June 7, 1989, now abandoned.

BACKGROUND OF THE INVENTION

1. Field of the Invention

The present invention relates to a capped or sealed rolling bearing, and more particularly, it relates to an improvement in sealed portions between sealing plates and a rotating race of a rolling bearing.

2. Related Background Art

In a conventional capped rolling bearing for example as disclosed in the Utility Model application Laid-open No. 62-85723, as shown in FIGS. 3 and 4, sealing plate receiving grooves 72 having appropriate shapes are formed in both edge portions of an inner peripheral surface of an outer race 70, and sealing plate receiving grooves 76 each having a U-shaped cross-section for slidably receiving sealing plate 80 are also formed in both edge portions of an outer peripheral surface of an inner race 74. Each sealing plate 80 comprises a metallic core 82 and a rubber seal 84 integrally fixed to the metallic core, which rubber seal 84 is provided at its outer periphery with a thickened attachment portion 86 to be fixed to the outer race 74 and is also provided at its inner periphery with an outer and inner lips 88 and 90 which extend obliquely in different directions. Each sealing plate can be arranged between the inner and outer races in such a manner that the attachment of fixing portion 86 of the sealing plate is fixedly fitted into the fixing groove 72 of the outer race, and the outer lip 88 is slidably abutted against an outer peripheral surface 94 contiguous to the slide groove 76 of the inner race and at the same time the inner lip 90 is slidably abutted against a vertical surface 92 of the inner race.

With this arrangment, since the two lips 88 and 90 have a common thinned portion or neck portion 96, these lips can be deformed integrally around the neck portion, whereby even if one of the lips 88 or 90 is worn to decrease its contact pressure against the surface 94 or 92, the contact pressure of the other lip 90 or 88 increases to compensate the reduction in the sealing ability of the one lip.

However, since the inner lip 90 is thicker and has greater rigidity with the result that it is difficult for the inner lip to deform in response to the movement of the bearing, (relative axial movement between the inner race and the outer race), the contact pressure of the inner lip 90 against the vertical surface 92 will inevitably increase, thus increasing a torque required for relatively rotating the inner and outer races.

SUMMARY OF THE INVENTION

It is an object of the present invention to provide a sealed rolling bearing which can eliminate the above-mentioned conventional drawback and can improve the response or following ability of an inner lip of each sealing plate to the movement of the bearing, thus enhancing or improving the sealing ability of the sealing plates.

In order to achieve the above object, the present invention provides a sealed rolling bearing, wherein (a) fixing grooves each for fixedly receiving a fixing edge portion of a corresponding one of the sealing plates are formed in the edge portions of a peripheral surface of one of inner and outer races, and slide grooves each for slidably receiving a slidable seal edge portion of a corresponding one of the sealing plates are formed in the edge portions of a peripheral surface of the other race, each slide groove having a U-shaped cross-section including a bottom surface, an axially outer surface and an axially inner surface; (b) each sealing plate comprises an annular core and a flexible seal member fixed integrally with the core, with first, second and third lips which respectively extend axially outwardly, axially inwardly and substantially radially, being formed on the slidable seal edge portion of the sealing plate; and (c) the first lip is slidably abutted against a peripheral surface contiguous to the axially outer surface of the corresponding slide groove, the second lip is slidably abutted against the axially inner surface of the corresponding slide groove, and the third lip is disposed in confronting relation to the bottom surface of the corresponding slide groove with a slight clearance therebetween.

Incidentally, it is preferable that a thinned neck portion is formed at root portions of the first and/or second lips (between the first and second lips) to improve the elastic deformability of the lips, if necessary. In this way, the response of the inner (second) lip slidably abutted against the axially inner surface of each slide groove to the movement of the bearing is enhanced to reduce the contact pressure of the inner lip, thus decreasing the torque for imparting the relative axial movement of the inner and outer races of the bearing.

DETAILED DESCRIPTION OF THE PREFERRED EMBODIMENT

The present invention will now be explained in connection with an embodiment thereof wherein an inner race of a rolling bearing is a rotating race, with reference to the accompanying drawings. However, it should be noted that the present invention is not limited to this embodiment, but may be applied to, for example, a sealed rolling bearing wherein an outer race is a rotating race.

Figure 1:
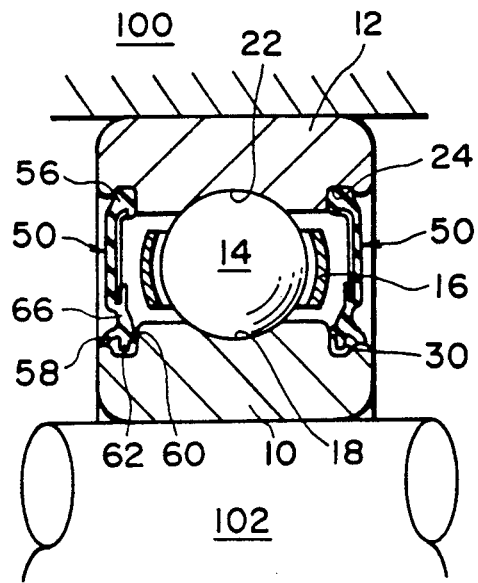
FIG. 1 is a cross-sectional view of a portion of a sealed rolling bearing according to the present invention.
Figure 2:
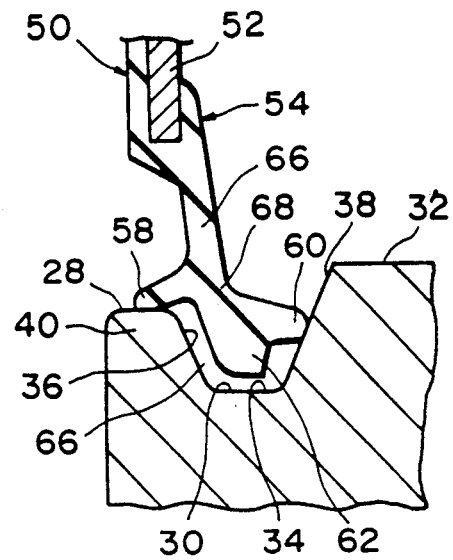
FIG. 2 is an enlarged sectional view showing a relation between a peripheral slide groove formed on a race of the rolling bearing and lips of each sealing plate.
Figure 3:
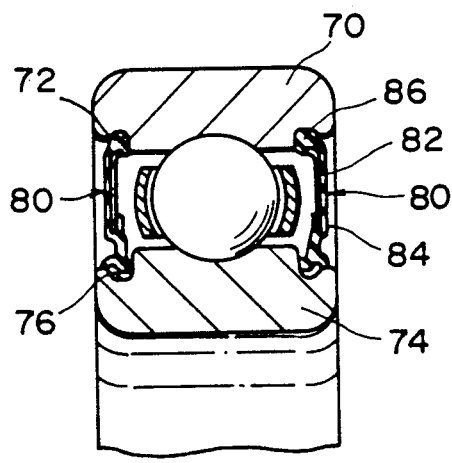
FIG. 3 is a cross-sectional view of a portion of a conventional sealed rolling bearing.
Figure 4:
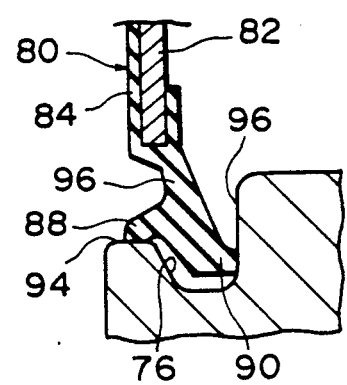
FIG. 4 is an enlarged sectional view showing a relation between a peripheral slide groove formed on a race and lips of each sealing plate of the rolling bearing of FIG. 3.

FIG. 1 is a cross-sectional view of a portion of a sealed rolling bearing wherein sealing plates are fixedly mounted on an outer race which is a non-rotating race, and FIG. 2 is an enlarged sectional view showing a non-fixed portion (i.e., slidable portion) of the sealing plate.

In FIG. 1, the sealed rolling bearing includes an inner race 10 which is a rotating race, an outer race 12 which is a non-rotating race, a plurality of balls 14 as rolling members arranged between the inner and outer races, a retainer 16 for retaining the balls in a predetermined condition, and a pair of sealing plates 50 arranged between both edge portions of an outer peripheral surface of the inner race 10 and corresponding edge portions of the outer race 12. The outer race 12 is fixed to a fixed portion such as housing 100, and a rotary shaft 102 is fitted into the inner race 10.

An annular rotating groove 18 for receiving the balls is formed in an axial central portion of the outer peripheral surface of the inner race 10, and slide grooves 30 each having a substantially U-shaped cross-section are formed in the both edge portions of the outer peripheral surface of the inner race 10. Further, an annular rotating groove 22 corresponding to the rotating groove 18 is formed in the inner peripheral surface of the outer race 12, and fixing grooves 24 are formed in the both edge portions of the inner peripheral surface of the outer race 12. Each of the sealing plates 50 is arranged between one of the respective slide grooves 30 and the corresponding one of fixing grooves 24, which will be described later. It should be noted that the left and right sealing structures are symmetrical with each other. Thus, only the left sealing structure will be described hereinafter, with reference to FIG. 2.

As shown in FIG. 2, the slide groove 30 is defined by a bottom surface 34 parallel to the outer peripheral surface 32 of the inner race 10, and a pair of inclined axially outer and inner surfaces 36 and 38 contiguous to the bottom surface 34 on both sides thereof. The inner surface 38 can be orthogonal to the axis of the inner race 10. The axially outward inclined surface 36 defines an inner surface of an annular rib 40. A height of the inclined surface 36 is slightly lower than a height of the axially inward inclined surface 38, in consideration of the easy assembling of the sealing plate 50. At least the inclined surface 38 of the groove 30 is formed at the same time when the rotating groove 18 is formed.

Next, the sealing plates 50 will be explained. Each sealing plate comprises an annular core 52 made of a metallic ring plate, and an annular seal member 54 integrally fixed at a base portion 51 thereof to the core 52 and made of plastic material such as rubber, synthetic resin and the like. The seal member 54 is provided at its outer peripheral edge with a thickened attachment portion 56 (FIG. 1) to be fixedly received into the corresponding fixing groove 24 of the outer race, and is also provided at its inner peripheral edge with three lips 58, 60 and 62.

More particularly, the first, second and third lips 58, 60 and 62 extend substantially axially outwardly, substantially axially inwardly and obliquely, respectively, from the inner edge portion of the seal member 54 extending radially inwardly from the inner edge of the annular core 52. The first lip 58 is positioned nearest to the core 52 and constitutes an outer lip, the third lip 62 is positioned farthest from the core, and the second lip 60 is positioned between the first and third lips in the radial direction and constitutes an inner lip.

The first or outer lip 58 is slidably abutted against an outer peripheral surface 28 contiguous to the inclined surface 36 of the slide groove 30, and the second or inner lip 60 is slidably abutted against an intermediate portion of the inclined surface 38 of the slide groove 30. Further, the third (intermediate) lip 62 is opposed to the bottom surface 34 of the slide groove with a small gap therebetween to form a labyrinth seal. Member 54 is formed with a first neck portion 66 between a root of the first lip 58 and the core 52, and a second neck portion 68 is formed between the first and second lips 58 and 60, i.e., at roots of the second and third lips 60 and 62. Thickness of the neck portion 68 is larger than that of the neck portion 66.

Incidentally, in the case of the rolling bearing wherein the outer race is the rotating race, the construction of each of the sealing plates 50 may be reversed at the inner and outer edges thereof (i.e., the lips may be formed on the outer peripheral edge of the sealing plate and the attachment portion 56 may be formed on the inner peripheral edge of the plate), and the fixing grooves may be formed in the inner race 10 and the slide grooves may be formed in the outer race 12.

In this way, by providing the first neck portion 66 formed at a non-fixed side of each sealing plate 50, i.e., a sliding side of the sealing plate, the ability of elastic deformation of each of the first, second and third lips 58-62 is enhanced, whereby these lips can follow or respond to the axial relative movement between the inner race 10 and the outer race 12. Further, by providing the second neck portion 68, the response ability of each of the first and second lips 58 and 60 is further improved.

As a result, the response ability of the whole sealing plate 50 to the movement of the bearing will be enhanced, thus preventing the reduction of the sealing ability of the sealing plate due to the wear of the lips 58, 60 and 62.

Further, the contact pressures of the lips against the outer surface 28 and the inclined surface 38 of the inner race 10 can be decreased, thus reducing the variation of the rotating torque.

In addition, since the non-contact labyrinth seal is formed between the third or intermediate lip 62 and the surfaces 34, 36 and 38, there can be provided a sealed rolling bearing which has a long service life and which can be operated with small torque.

We claim:

1. A sealed rolling bearing including inner and outer races (10,12) coaxially arranged with the interposition of rolling members (14), and a pair of sealing plates (50) arranged between opposite edge portions of an outer peripheral surface of said inner race and corresponding opposite edge portions of an inner peripheral surface of said outer race, wherein:

fixing grooves (24) each for fixedly receiving a fixing edge portion (56) of a corresponding one of said sealing plates are formed in said edge portions of said peripheral surface of one of said inner and outer races, and slide grooves (30) each for slidably receiving a slidable seal edge portion of a corresponding one of said sealing plates are formed in aid edge portions of said peripheral surface of the other race, each of said slide grooves having a U-shaped cross-section including a bottom surface (34) and axially outer and inner surfaces (36 and 38) transverse to the bottom surface; and each of said sealing plates comprises an annular core (50), a flexible seal member (54) integrally fixed to said core, and first, second and third lips (58, 60 and 62) which respectively extend substantially axially outwardly, substantially axially inwardly and substantially radially formed on said slidable seal edge portion thereof, said first lip being slidably abutted against a peripheral surface contiguous to said axially outer surface of the corresponding slide groove, said second lip being slidably abutted against said axially inner surface of the corresponding slide groove, and said third lip being disposed in confronting relation to said bottom surface of the corresponding slide groove with a slight clearance therebetween.

2. A sealed rolling bearing according to claim 1, wherein said axially outer and inner surfaces of each slide groove are contiguous to and inclined with respect to the bottom surface thereof.

3. A sealed rolling bearing including inner and outer races coaxially arranged with the interposition of rolling members, and a pair of sealing plates arranged between opposite edge portions of an outer peripheral surface of said inner race and corresponding opposite edge portions of an inner peripheral surface of said outer race, wherein:

fixing grooves each for fixedly receiving a fixing edge portion of a corresponding one of said sealing plates are formed in said edge portions of said peripheral surface of one of said inner and outer races, and slide grooves each for slidably receiving a slidable seal edge portion of a corresponding one of said sealing plates are formed in said edge portions of said peripheral surface of the other race;

each of said slide grooves has a U-shaped cross-section including a bottom surface and axially outer and inner surfaces transverse to the bottom surface; and each of said sealing plates comprises a core member and a flexible seal member integrally fixed to said core member, and has its slidable seal edge portion formed with first and second lips which respectively extend substantially axially outwardly and substantially axially inwardly as well as a third lip which extends substantially radially, said first lip having a first neck portion of relatively small thickness at a root portion thereof and being slidably abutted against an outer peripheral surface contiguous to said axially outer surface of the corresponding slide groove, said second lip having a second neck portion of relatively large thickness at a root portion thereof and being slidably abutted against said axially inner surface of the corresponding slide groove, and said third lip opposing said bottom surface of the corresponding slide groove with a slight clearance to form a labyrinth seal.

4. A sealed rolling bearing according to claim 3, wherein said fixing grooves are formed on said outer race, which is disposed in a fixed condition, while said slide grooves are formed on said inner race, which is disposed rotatably.

5. A sealed rolling bearing according to claim 4, wherein said axially inner and outer surfaces of each slide groove are contiguous to and inclined with respect to said bottom surface thereof.

6. A sealed rolling bearing according to claim 3, wherein said axially inner and outer surfaces of each slide groove are contiguous to and inclined with respect to said bottom surface thereof.

7. A sealed rolling bearing including inner and outer races coaxially arranged with the interposition of rolling members, and a pair of sealing plates arranged between opposite edge portions of an outer peripheral surface of said inner race and corresponding opposite edge portions of an inner peripheral surface of said outer race, wherein:

fixing grooves each for fixedly receiving a fixing edge portion of a corresponding one of said sealing plates are formed in said edge portions of said peripheral surface of one of said inner and outer races, and slide grooves each for slidably receiving a slidable seal edge portion of a corresponding one of said sealing plates are formed in said edge portions of said peripheral surface of the other race;

each of said slide grooves has a U-shaped cross-section including a bottom surface and axially outer and inner surfaces transverse to the bottom surface; and each of said sealing plates comprises a core member and a flexible seal member integrally fixed at a base portion thereof to said core member, and has its slidable seal edge portion formed with first, second and third lips joined to said base portion through a first elastic deformation enhancing thinned neck portion, with said first and second lips extending generally oppositely in substantially axial directions and said third lip extending substantially radially from between said first and second lips, a second deformation enhancing thinned neck portion being formed at roots of said second and third lips, one of said first and second lips slidably abutting one of said axially outer and inner surfaces of the corresponding slide groove, the other of said first and second lips slidably abutting a surface contiguous to the other of said axially outer and inner surfaces of the corresponding slide groove, and said third lip being opposed to said bottom surface of the corresponding slide groove with a slight clearance to form a labyrinth seal.

8. A sealed rolling bearing according to claim 7, wherein said first neck portion is of smaller thickness than said second neck portion.

9. A sealed rolling bearing according to claim 7, wherein said fixing grooves are formed on said outer race, which is disposed in a fixed condition, while said slide grooves are formed on said inner race, which is disposed rotatably.

10. A sealed rolling bearing according to claim 7, wherein said axially inner and outer surfaces of each slide groove are contiguous to and inclined with respect to said bottom surface thereof.

* * * * *